United States Patent Office 2,845,971
Patented Aug. 5, 1958

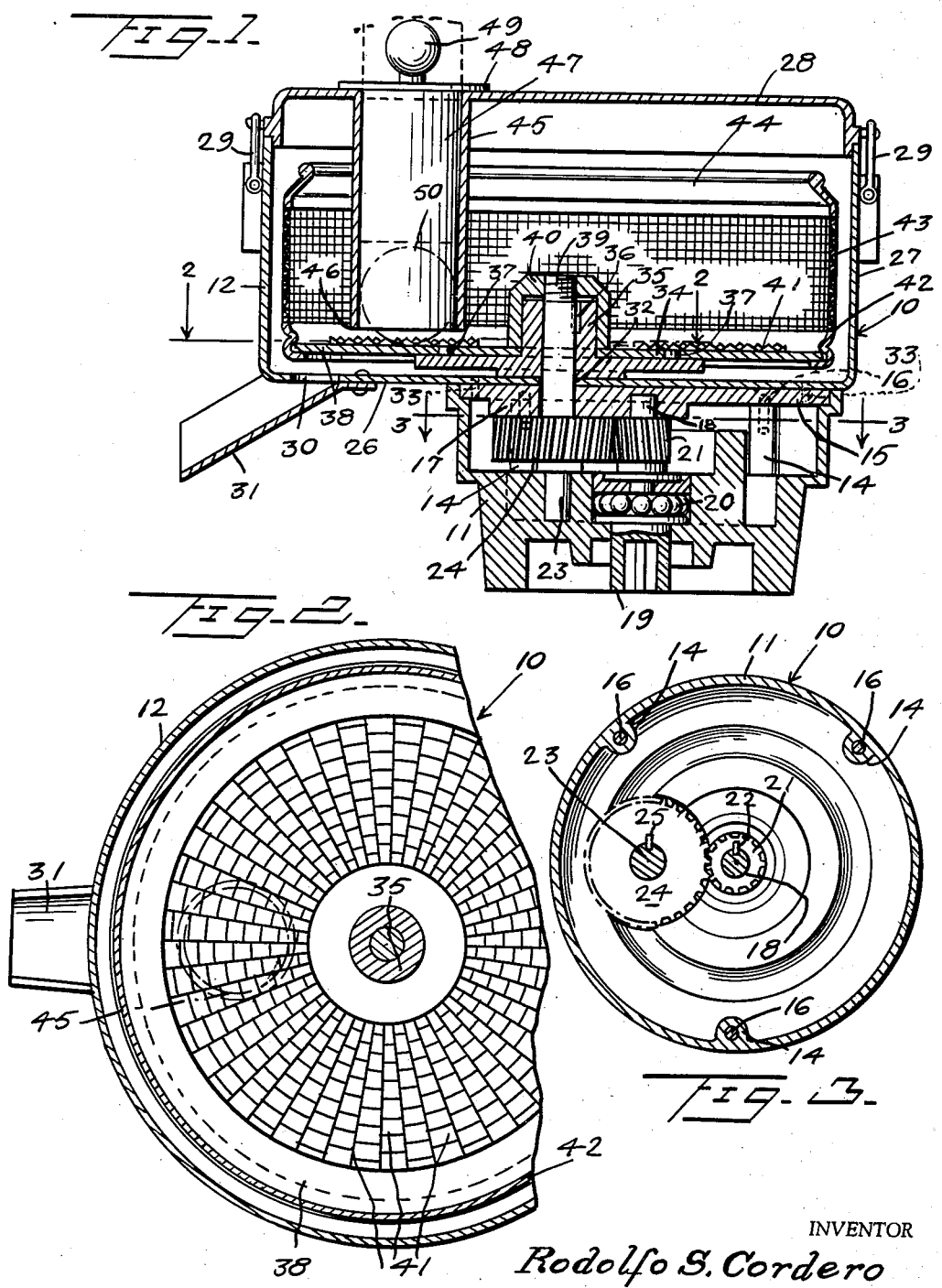

2,845,971

JUICE EXTRACTOR

Rodolfo Sosa Cordero, Mexico City, Mexico

Application April 17, 1956, Serial No. 578,801

1 Claim. (Cl. 146—76)

The present invention relates to juice extractors, and more particularly, to devices for completely shredding the pulp of a fruit or vegetable so that all juice is extracted therefrom.

The primary object of the invention is to provide a juice extractor which will rapidly completely reduce the fruit by a shredding action leaving a pulpy mass from which the juice will readily drain.

Another object of the invention is to provide a juice extractor of the type described above into which fruit can be inserted without removing the cover of the extractor which would permit the escape of material from the extractor.

Another object of the invention is to provide a juice extractor of the class described above in which the mechanical portions of the device coming in contact with the fruit and fruit juices can be readily disassembled for adequate and complete cleaning and sterilizing after use.

A still further object of the invention is to provide a juice extractor of the shredding type which will be inexpensive to manufacture, simple and safe to use, and completely effective in its action.

Other objects and advantages will become apparent in the following specification when considered in the light of the attached drawings, in which:

Figure 1 is a vertical section taken through the center of the juice extractor.

Figure 2 is a fragmentary horizontal cross-section taken along the line 2—2 of Figure 1, looking in the direction indicated.

Figure 3 is a transverse cross-section taken in the horizontal plane of line 3—3 of Figure 1, looking in the direction of the arrows.

Referring now to the drawings in detail wherein like reference numerals indicate like parts throughout the several figures, the reference numeral 10 indicates generally a juice extractor which consists of a transmission housing 11 and an extractor container 12 mounted thereon.

The transmission housing 11 is cylindrical and is provided with a plurality of bosses 14 which extend radially inwardly from the housing 11 and are circumferentially spaced thereabout. A transmission housing cover 15 is positioned against the open end of the housing 11 and is provided with a plurality of securing bolts 16 which extend through the cover 15 into threaded bores in the bosses 14 to secure the cover 15 to the housing 11.

The cover 15 is provided with a downwardly offset plate 17, as illustrated in Figure 1, for purposes to be described. A shaft 18 extends vertically in the housing 11 and has its upper end journalled to the plate 17. The lower end of the shaft 18 is formed into a socket 19 and the medial portion of the shaft 18 is provided with a bearing 20 for supporting the shaft 18 in the housing 11. A gear 21 is locked to the shaft 18 by means of a key 22.

A shaft 23 has its lower end journalled in the housing 11 and extends upwardly projecting through the cover 15 a substantial distance thereabove. A gear 24 is pinned to the shaft 23 by means of a key 25 with the gear 24 positioned so as to be in mesh with the gear 21, as illustrated in Figure 3. The socket 19 is adapted to be connected to a drive mechanism so that upon rotation of the drive mechanism the shaft 18 and the shaft 23 will be caused to rotate.

The extractor container 12 is provided with a bottom wall 26, a cylindrical side wall 27, a cover 28, and cover retainer clamps 29. The bottom wall 26 has a juice drain opening 30 extending therethrough and a delivery spout 31 is secured to the bottom wall 26 so as to underlie the delivery opening 30 to direct material leaving the container 12 to the desired point.

The container 12 is provided with an axial bore 32 through which the shaft 23 extends. The container 12 has the bottom wall thereof secured to the cover 15 by means of securing elements 33, as illustrated in Figure 1. A disc 34 is provided with a hub 35 which is mounted on the shaft 23 and keyed thereto by the key 36. The disc 34 is provided with drive pins 37 which project upwardly from the upper face of the disc. A shredding disc 38 having a central aperture is positioned over the hub 35 and is also provided with apertures engaging over the drive pins 37. The upper end of the shaft 23 is threaded as at 39 and receives a cup-shaped retainer nut 40 which engages around the hub 35 as secures the shredding disc 38 to the driving disc 34. The upper face of the shredding disc 38 is provided with a plurality of teeth 41, as illustrated in Figures 1 and 2. A cylindrical basket 42 has its lower edge crimped over the peripheral edge of the shredding disc 38 with the basket 42 extending perpendicularly thereto. The basket 42 is provided with a mesh side wall as illustrated at 43 which terminates at its upper end in an inwardly directed top flange 44.

A tubular filler member 45 is formed integrally with the cover 28 and projects inwardly therefrom with the lower end 46 thereof spaced above the teeth 41, as illustrated in Figure 1. A cylindrical tamper 47 is carried by the tubular member 45 and has a flange 48 adjacent its upper edge for engaging the top wall of the cover 28 to serve as a cover for the tubular member 45. A handle 49 projects upwardly from the flange 48 providing a means for manipulating the tamper 47.

In the use and operation of the invention, either fruit or vegetable material is dropped into the tubular element 45 to assume a position as shown at 50. The shredder disc 38 is caused to rotate along with the basket 42 so that the teeth 41 rapidly shred the fruit or vegetable 50 reducing it to a pulpous nature which impinges on the screen 43. The juice will readily pass through the screen and out through the opening 30 into the spout 31, while large portions of the pulp, seeds, and the like, will be retained in the basket 42. Obviously, some of the pulp will pass through the screen 43 to be removed by other refining steps in the preparation of the juice. The provision of the cup-shaped nut 40 and the particular arrangement of the shredding disc 38 with relation to the driving disc 34 permits the structure to be readily disassembled for cleaning purposes.

Having thus described the preferred embodiment of the invention, it should be understood that numerous modifications and structural adaptations might be resorted to without departing from the scope of the appended claim.

What is claimed is:

A juice extractor attachment for a drive motor comprising a transmission housing, a speed reducing transmission in said housing, coupling means depending from said housing for coupling said transmission to a drive motor, an extractor container detachably secured to the side of said housing opposite said coupling, a threaded shaft projecting upwardly from said transmission into said container centrally thereof, a substantially flat drive disc, a hub integrally formed on said drive disc and projecting upwardly therefrom, means keying said hub to said shaft, drive pins extending upwardly on said drive disc, a substantially flat shredder disc having a central aperture therein to receive said hub and also having apertures therein to receive said drive pins, a plurality of shredder teeth integrally formed on the upper surface of said shredder disc, a cup-shaped nut secured to the upper end of said shaft and encompassing the upper end of said hub to engage said shredder disc thereby locking said shredder disc to said drive disc, and a basket including a cylindrical perforate wall having its lower edge portion crimped over the peripheral edge of said shredder disc securing said basket to said shredder disc.

References Cited in the file of this patent

UNITED STATES PATENTS

| | | |
|---|---|---|
| 2,289,656 | Knapp | July 14, 1942 |

FOREIGN PATENTS

| | | |
|---|---|---|
| 284,332 | Switzerland | Nov. 17, 1952 |
| 730,105 | Great Britain | May 18, 1955 |